Patented Sept. 16, 1924.

1,508,401

UNITED STATES PATENT OFFICE.

WALTER KROPP AND LUDWIG TAUB, OF ELBERFELD, GERMANY, ASSIGNORS TO FARBENFABRIKEN VORM. FRIEDR. BAYER AND CO., OF LEVERKUSEN, NEAR COLOGNE ON THE RHINE, GERMANY.

PHARMACEUTICAL PRODUCT.

No Drawing.   Application filed October 15, 1923.   Serial No. 668,738.

*To all whom it may concern:*

Be it known that we, WALTER KROPP and LUDWIG TAUB, citizens of Germany, residing at Elberfeld, in the State of Prussia, Germany, have invented new and useful Improvements in Pharmaceutical Products, of which the following is a specification.

This invention relates to the manufacture of a new pharmaceutical product, being a compound of Phenylethylbarbituric acid and a 4-dimethylamino-1-phenyl-2.3-dimethyl-5-pyrazolon.

The new compound is a whitish crystallized product soluble in alcohol. It crystallizes from benzene in the form of needles melting at 132° C. It has proved to be a valuable hypnotic and analgetic; an average single dose being about ½ gram.

The new compound is produced by allowing the above mentioned components to react on each other either in solution or by melting them together.

For instance we proceed as follows:—

232 parts by weight of phenylethylbarbituric acid are dissolved in ether and an ethereal solution of 4-dimethylamino-1-phenyl-2.3-dimethyl-5-pyrazolon is added thereto. By concentrating the mixture the new complex compound separates.

We claim:

The herein described compound consisting of phenylethylbarbituric acid and 4-dimethylamino-1-phenyl-2.3-dimethyl-5-pyrazolon, the compound having a whitish coloration, soluble in alcohol, melting at 132° C. having strong analgetic and soporific properties, substantially as described.

In testimony whereof we have hereunto set our hands.

WALTER KROPP.
LUDWIG TAUB.